United States Patent
Reddy et al.

(10) Patent No.: US 10,785,291 B2
(45) Date of Patent: Sep. 22, 2020

(54) EXECUTING AD-HOC COMMANDS ON-DEMAND IN A PUBLIC CLOUD ENVIRONMENT ABSENT USE OF A COMMAND LINE INTERFACE

(71) Applicant: BANK OF AMERICA CORPORATION, Charlotte, NC (US)

(72) Inventors: Rajashekar A. Reddy, Hinsdale, IL (US); Dhananjay Bhat, North Chelmsford, MA (US); Abdul Rafman Azeez, Watchung, NJ (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 212 days.

(21) Appl. No.: 15/975,202

(22) Filed: May 9, 2018

(65) Prior Publication Data
US 2019/0349424 A1 Nov. 14, 2019

(51) Int. Cl.
*H04L 29/08* (2006.01)
*G06F 9/50* (2006.01)
*H04W 84/18* (2009.01)

(52) U.S. Cl.
CPC ........ *H04L 67/1012* (2013.01); *G06F 9/5072* (2013.01); *H04L 67/1014* (2013.01); *H04W 84/18* (2013.01)

(58) Field of Classification Search
CPC . H04L 67/1012; H04L 67/1014; H04L 67/10; H04L 63/00; G06F 9/5072; G06F 21/31; G06F 21/604; H04W 84/18
See application file for complete search history.

(56) References Cited

U.S. PATENT DOCUMENTS

| | | | |
|---|---|---|---|
| 8,856,292 B2 | 10/2014 | Srinivasan et al. |
| 8,856,790 B1 | 10/2014 | Feathergill et al. |
| 8,996,865 B2 | 3/2015 | Sweet et al. |
| 9,043,783 B2 | 5/2015 | Landsman |
| 9,065,804 B2 | 6/2015 | Sweet et al. |
| 9,124,639 B2 | 9/2015 | Srinivasan et al. |
| 9,124,640 B2 | 9/2015 | Sweet et al. |
| 9,270,703 B1 | 2/2016 | Clough et al. |
| 9,369,493 B2 | 6/2016 | Sweet et al. |
| 9,497,224 B2 | 11/2016 | Sweet et al. |
| 9,584,378 B1 | 2/2017 | Adam et al. |

(Continued)

*Primary Examiner* — Umar Cheema
*Assistant Examiner* — James Ross Hollister
(74) *Attorney, Agent, or Firm* — Michael A. Springs; Moore & Van Allen PLLC; James C. Edwards

(57) ABSTRACT

The present invention provides for indirect access to public cloud-based computing environments for the purpose of running ad-hoc commands, on-demand, on any public cloud-based computing resource. Messages including the ad-hoc commands are communicated to a cloud-based command queue, which acts as the intermediary between the user (i.e., command requester) and the public cloud-based computing resources. A command executor agent installed on the cloud-based computing resources, polls the command queue for commands designated for the application(s) currently being executed on the cloud-based computing resources. Results of the command are communicated from the cloud-based computing resource to the command queue, which is periodically polled by a monitoring queue in order for the user/command requester to obtain the results of the execution of the command.

17 Claims, 5 Drawing Sheets

(56) References Cited

U.S. PATENT DOCUMENTS

| | | |
|---|---|---|
| 9,672,371 B2 | 6/2017 | Mendez et al. |
| 9,794,292 B2 | 10/2017 | Hussain et al. |
| 10,348,702 B1* | 7/2019 | Sundaram ............... H04L 9/083 |
| 2010/0042720 A1* | 2/2010 | Stienhans ............. G06F 9/5072 |
| | | 709/226 |
| 2011/0029882 A1 | 2/2011 | Jaisinghani |
| 2011/0055588 A1 | 3/2011 | DeHaan |
| 2011/0265164 A1 | 10/2011 | Lucovsky et al. |
| 2012/0102183 A1* | 4/2012 | Murakami ............ G06F 9/5027 |
| | | 709/224 |
| 2012/0179824 A1* | 7/2012 | Jackson ................ G06F 9/5027 |
| | | 709/226 |
| 2012/0281708 A1 | 11/2012 | Chauhan et al. |
| 2013/0132461 A1 | 5/2013 | Patel |
| 2013/0139217 A1 | 5/2013 | Xie |
| 2014/0108665 A1 | 4/2014 | Arora et al. |
| 2014/0281511 A1* | 9/2014 | Kaushik ................ G06F 21/602 |
| | | 713/164 |
| 2015/0067171 A1 | 3/2015 | Yum et al. |
| 2016/0344671 A1* | 11/2016 | Hussain ................ H04L 51/046 |
| 2017/0270091 A1 | 9/2017 | Singh et al. |
| 2018/0183762 A1* | 6/2018 | Fetvadjiev ............ G06F 9/5072 |
| 2018/0288134 A1* | 10/2018 | Bonagiri ............... G06F 16/254 |
| 2019/0384632 A1* | 12/2019 | Parikh ................. H04L 63/0464 |

* cited by examiner

EXECUTING AD-HOC COMMANDS ON-DEMAND IN A PUBLIC CLOUD ENVIRONMENT ABSENT USE OF A COMMAND LINE INTERFACE

FIELD

In general, embodiments of the invention relate to cloud computing, and more specifically, providing the ability to execute ad-hoc commands on-demand in a public cloud environment through indirect communication with the cloud through a cloud-based queue.

BACKGROUND

Typically large enterprises, as a means of insuring information security, do not allow for users to access a console or command line interface to run ad-hoc commands, on-demand, on public cloud-based computing resources. In this regard, security guidelines and policies are implemented within such large enterprises that prohibit access to run commands within the public cloud environment.

In order to provide a user access to a console or conventional command line interface, a user must input credentials (e.g., ID and password or the like) into the public cloud environment. In the event that the user credentials are obtained by adverse entities through unauthorized access to the public cloud environment (i.e., hacking or the like), the adverse entity may be in a position to gain unauthorized access to the enterprise's computing network.

Therefore, a need exists to allow users to run ad-hoc commands, on-demand in public cloud computing environment without using a conventional console or command line interface (i.e., without providing direct access to the cloud-based computing resources). In addition, a need exists to be able to provide results of the ad-hoc commands run on-demand on the public cloud-based computing resources in an indirect manner without the need to directly access the console or command line interface of the public cloud-based computing resource. In addition a need exists to insure that user credentials are not exposed to the cloud computing environment during execution of ad-hoc commands executed on public cloud-based computing resources.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing systems, apparatus, computer program products, and the like for indirect access to public cloud-based computing environments for the purpose of running ad-hoc commands, on-demand, on any public cloud-based computing resource. The present invention provides for messages including the ad-hoc commands to be communicated to a cloud-based command queue, which acts as the intermediary between the user (i.e., command requester) and the public cloud-based computing resources. Additionally, the present invention provides for a command executor agent installed on the cloud-based computing resources, which polls the queue for associated commands (i.e., commands that are designated for the application(s) being executed on the cloud-based computing resources. Results of the command are communicated from the cloud-based computing resource to the command queue, which is periodically polled by monitoring queue in order for the user/command requester to obtain the results of the execution of the command.

Thus, by indirectly accessing the cloud-based communicating resources through use of the command queue, the present invention avoids the need to directly access a console and/or command line interface to input the commands and, in doing so, eliminates the need to expose user credentials at the public cloud environment level.

A system for executing ad-hoc commands on cloud-based computing resources in a public cloud computing environment defines first embodiments of the invention. The system includes a computing platform having a memory and at least one processor in communication with the memory. The system includes a command entry interface that is stored in the memory and executable by the at least one processor. The command entry interface is configured to (i) receive one or more ad-hoc commands that require on-demand execution by an application being run on one or more cloud-based computing resources within the public cloud computing environment, and (ii), in response to receiving the ad-hoc command(s) generate and communicate, to the public cloud computing environment, one or more messages including the one or more commands.

The system additionally includes a command queue stored in cloud computing environment memory and configured to (i) receive and store the one or more messages including the one or more commands and (ii) receive and store the result of executing the one or more commands within the one or more applications running on the associated cloud-based computing resource. Additionally, the system includes a command executor agent installed on the one or more cloud-based computing resources and configured to (i) poll the command queue to retrieve one or more commands that are associated with one or more applications currently running on an associated cloud-based computing resource, (ii) execute the retrieved one or more commands within the one or more applications, and (iii) communicate a result of executing the one or more commands to the command queue.

In specific embodiments the system further includes a command queue monitor stored in the memory, executable by the at least one processor and configured to poll the command queue to retrieve the result of executing the one or more commands within the one or more applications running on the associated cloud-based computing resource.

In further specific embodiments of the system the one or more commands are selected from a plurality of predetermined commands that have been scanned and approved for execution by the one or more applications running on associated cloud-based computing resources. In other related embodiments of the system, the command entry interface is further configured to, upon receipt of one or more commands, scan the one or more commands and, based on a result of the scan, provide approval for the command to be executed by the one or more applications running on the associated cloud-based computing resources.

In still further specific embodiments of the system, the command queue is further configured to determine a number of simultaneous command executions allowed for a cloud-based computing resource and throttle the retrieval of commands by the cloud-based computing resource based on the number of simultaneous command executions allowed for the cloud-based computing resource.

In additional specific embodiments of the system, the command entry interface is further configured to encrypt the one or more commands in the one or more messages prior to communicating the one or more messages to the public cloud computing environment. In such embodiments of the system, the command executor agent is further configured to decrypt the one or more commands in the one or more messages prior to executing the one or more commands within the one or more applications running on the associated cloud-based computing resource. In other related specific embodiments of the invention, the command executor agent is further configured to encrypt the result of executing the one or more commands prior to communicating the result to the command queue and the command queue monitor is further configured to decrypt the result.

Moreover, in further specific embodiments of the system, the command entry interface is configured to generate and communicate the one or more messages that identify at least one of (i) the one or more applications, (ii) the one or more cloud-based computing resource and (iii) one or more cloud computing networks. In addition, in other specific embodiments of the invention, the command entry interface is configured to generate and communicate the one or more messages, which do not identify user credentials associated with the user that inputted the one or more commands. In this regard, the user credentials are not communicated to the cloud-based command queue as part of the message.

An apparatus for executing ad-hoc commands on cloud-based computing resources in a public cloud computing environment defines second embodiments of the invention. The apparatus includes a computing platform having a memory and at least one processor in communication with the memory. The apparatus further includes a command entry interface that is stored in the memory and executable by the at least one processor. The command entry interface is configured to (i) receive one or more commands that require execution by an application being run on one or more cloud-based computing resources within the public cloud computing environment, and (ii) generate and communicate one or more messages including the one or more commands to the public cloud computing environment. A command queue stored in the public cloud computing environment receives and stores the one or more messages and a command executor agent installed on the one or more cloud-based computing resources polls the command queue to retrieve one or more commands that are associated with one or more applications currently running on an associated cloud-based computing resource, executes the retrieved one or more commands within the one or more applications, and communicates a result of executing the one or more commands to the command queue.

In specific embodiments the apparatus further includes a command queue monitor that is stored in the memory and executable by the at least one processor. The command queue monitor is configured to poll the command queue to retrieve and store the result of executing the one or more commands within the one or more applications running on the associated cloud-based computing resource.

In specific embodiments of the apparatus, the one or more commands are at least one of (i) selected from a plurality of predetermined commands that have been scanned and approved for execution by the one or more applications running on associated cloud-based computing resources, and (ii) scanned at the command entry interface and, based on a result of the scan, approved for execution on the cloud-based computing resources.

In further specific embodiments of the apparatus, the command entry interface is further configured to encrypt the one or more commands in the one or more messages prior to communicating the one or more messages to the public cloud computing environment.

In other specific embodiments of the apparatus, the command entry interface is configured to generate and communicate the one or more messages, which identify at least one of (i) the one or more applications, (ii) the one or more cloud-based computing resource and (iii) one or more cloud computing networks.

In still further specific embodiments of the apparatus, the command entry interface is configured to generate and communicate the one or more messages, which do not identify user credentials associated with a user that inputted the one or more commands.

A computer program product including a non-transitory computer-readable medium defines third embodiments of the invention. The computer-readable medium includes a first set of codes for causing a computer to receive one or more commands that require execution by an application being run on one or more cloud-based computing resources within the public cloud computing environment. Additionally, the computer-readable medium includes a second set of codes for causing a computer to generate and communicate one or more messages including the one or more commands to a public cloud computing environment.

In addition, the computer-readable medium includes a third set of codes for causing a virtual computer to receive and store, at a cloud-based command queue, the one or more messages including the one or more commands. Additionally, the computer-readable medium includes a fourth set of codes for causing a virtual computer to poll, from a cloud-based computing resource, the command queue to retrieve one or more commands that are associated with one or more applications currently running on the cloud-based computing resource. Moreover, the computer-readable medium includes a fifth set of codes for causing a virtual computer to execute, at the cloud-based computing resource with the one or more applications, the retrieved one or more commands and a sixth set of codes for causing a virtual computer to communicate a result of executing the one or more commands to the command queue.

In additional specific embodiments of the computer program product, the computer-readable medium includes a seventh set of codes for causing a computer to poll the command queue to retrieve the result of executing the one or more commands within the one or more applications running on the associated cloud-based computing resource.

In still further specific embodiments of the computer program product, the one or more commands are at least one of (i) selected from a plurality of predetermined commands that have been scanned and approved for execution by the one or more applications running on associated cloud-based computing resources, and (ii) scanned at the command entry interface and, based on a result of the scan, approved for execution on the cloud-based computing resources.

Thus, systems, apparatus, methods, and computer program products herein described in detail below provide for indirect access to public cloud-based computing environments for the purpose of running ad-hoc commands, on-demand, on any public cloud-based computing resource. As such, by being able to execute commands without having to directly access the cloud computing resources via a console and/or command line interface, the present invention provides added security, in that, user credentials are not required to be communicated to the cloud computing environment.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
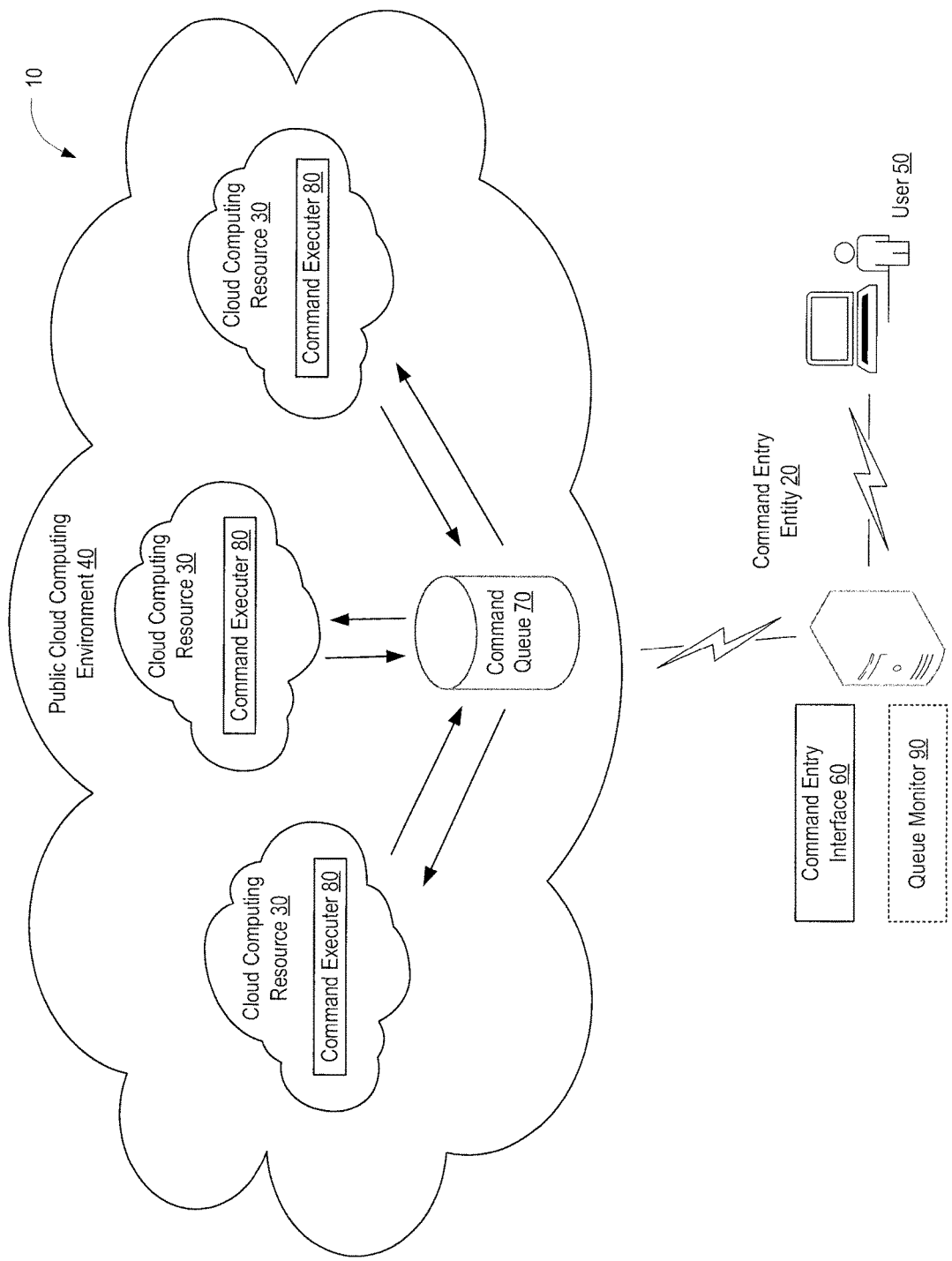
Figure 2:
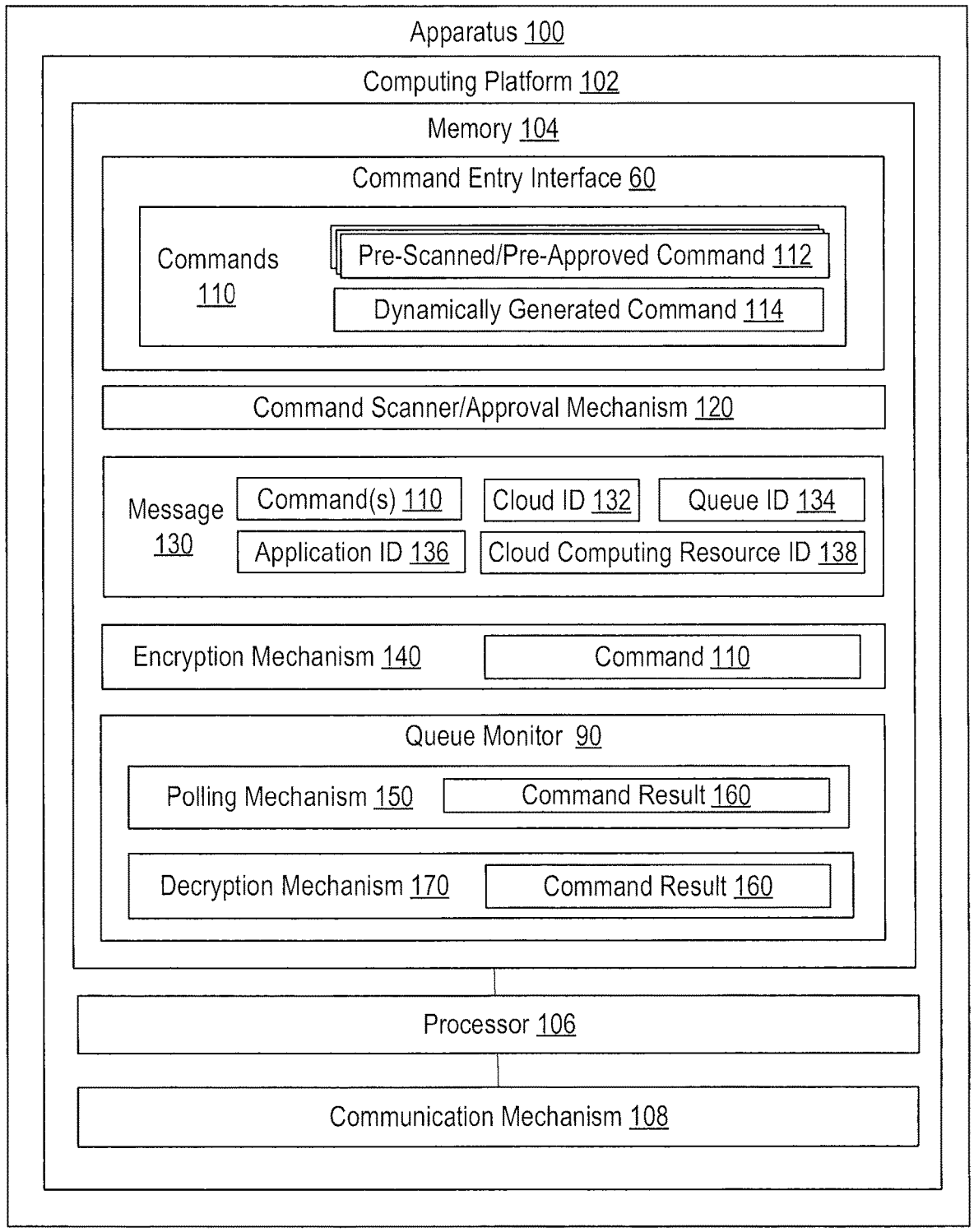
Figure 3:
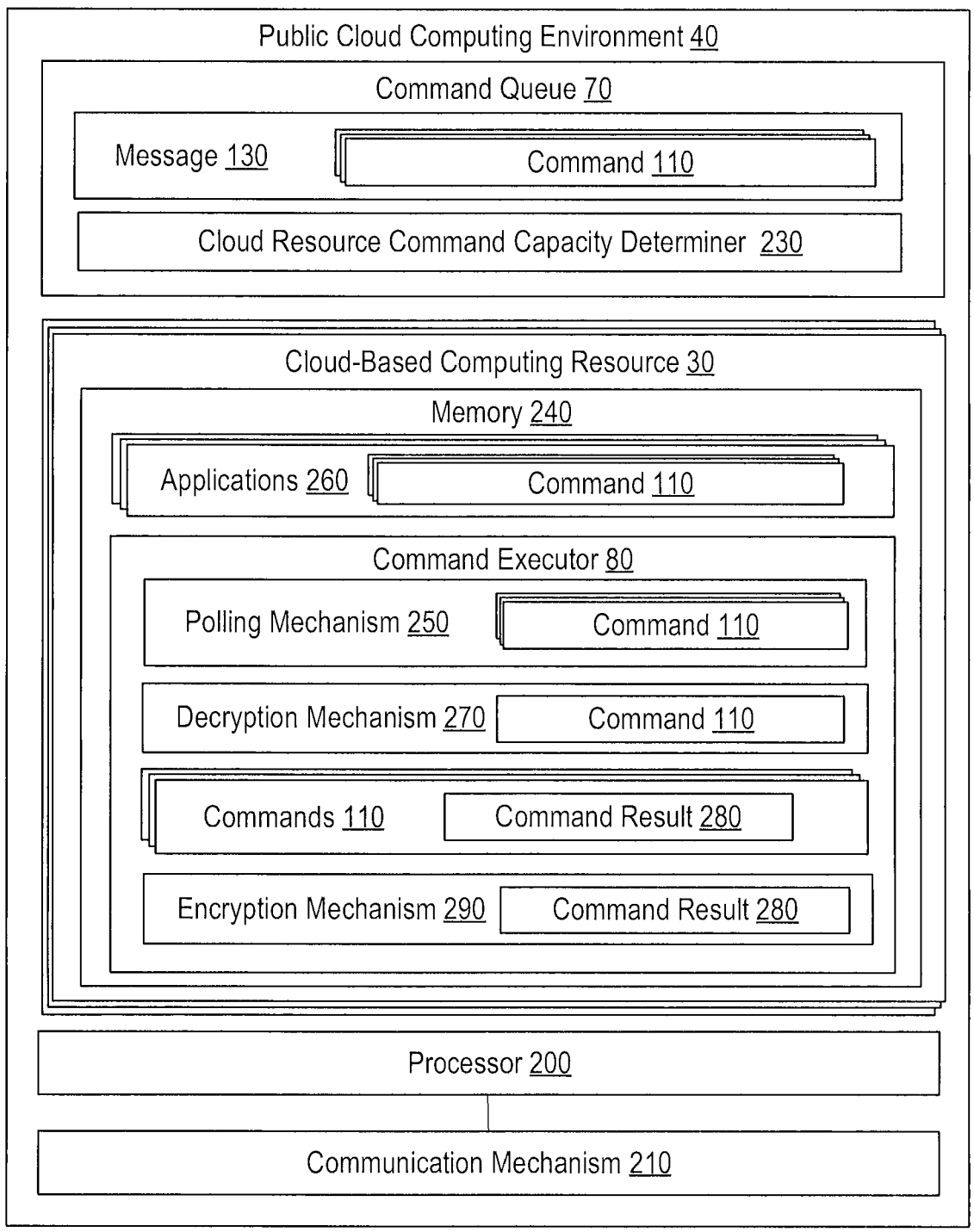
Figure 4:
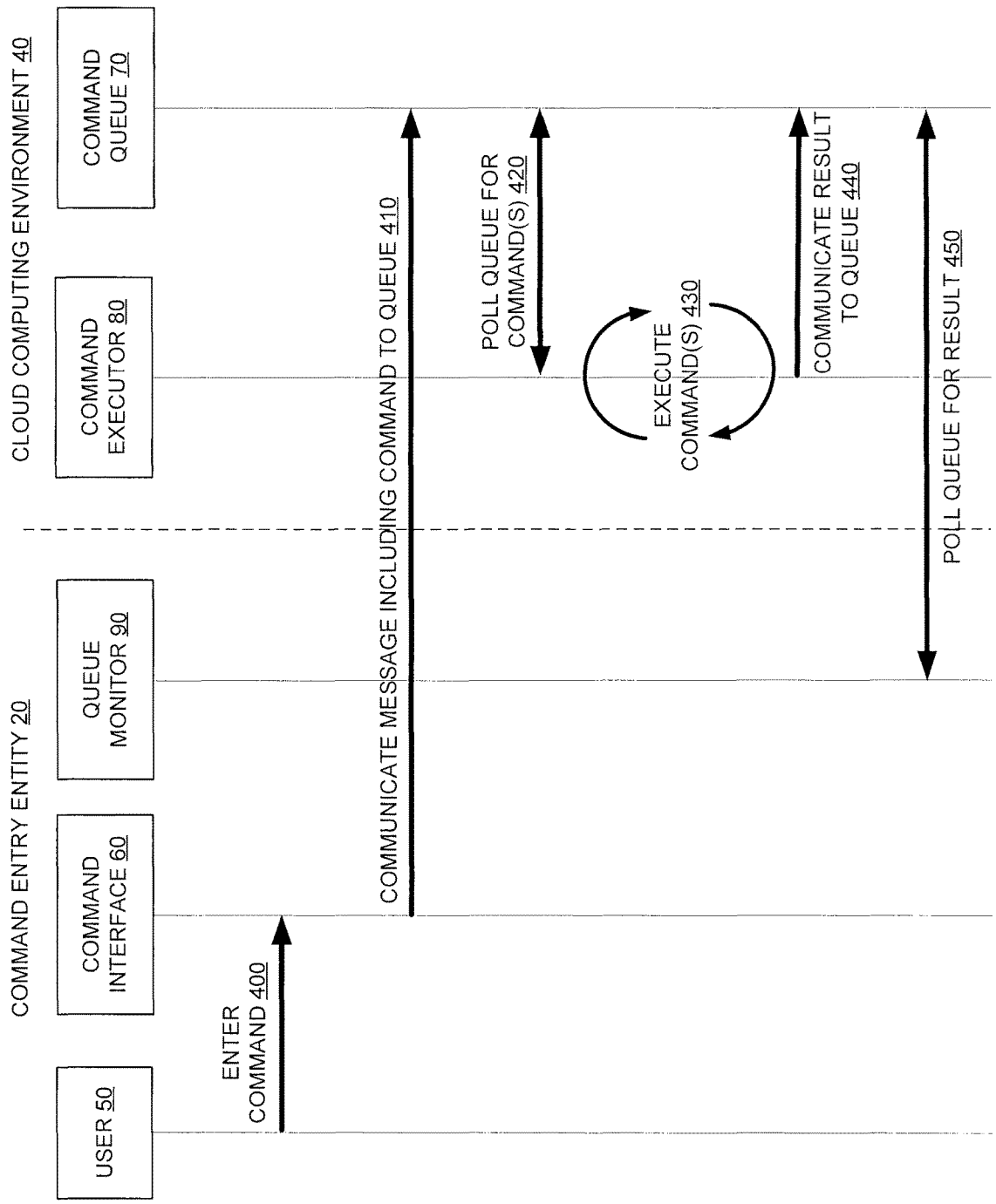
Figure 5:
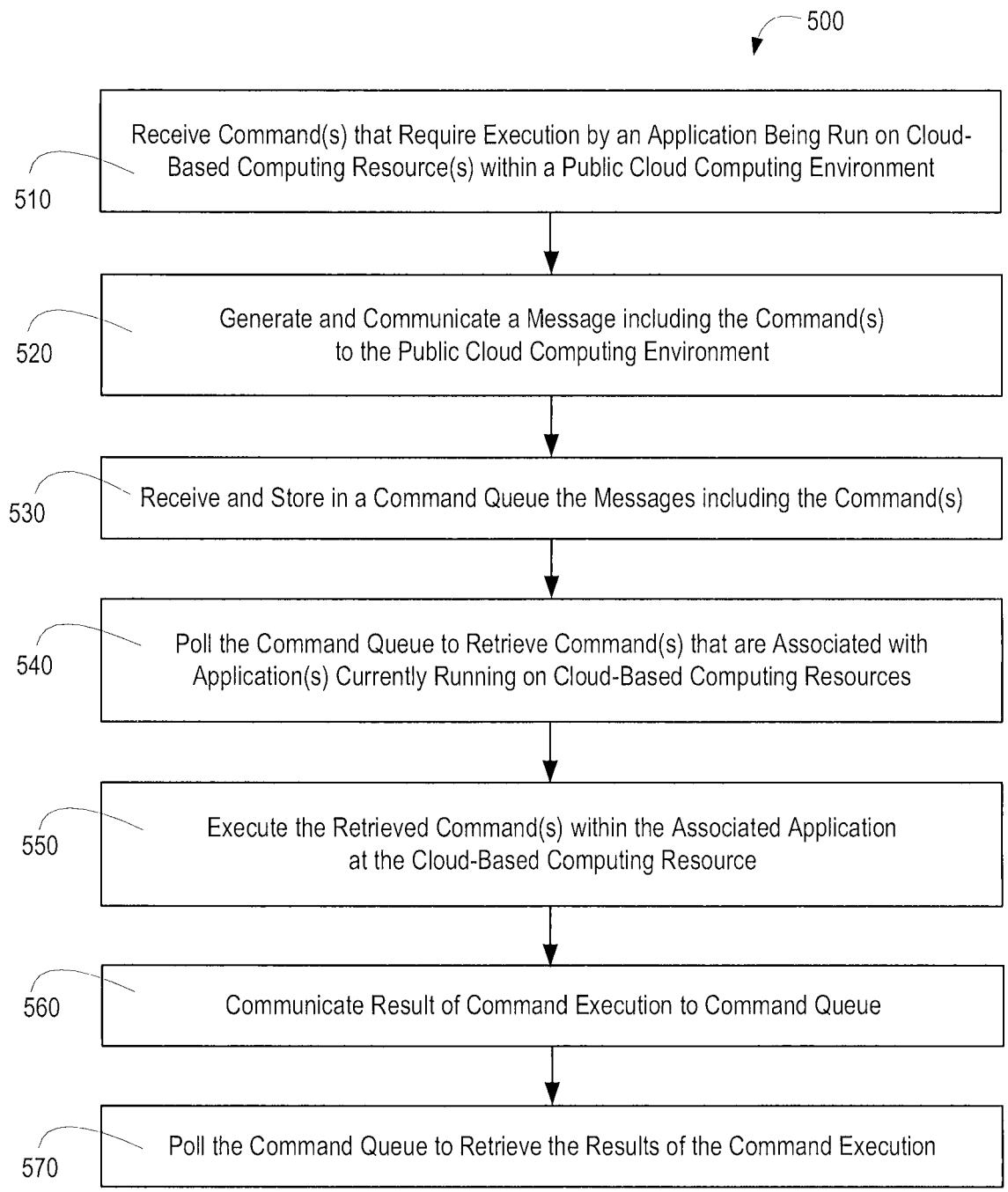

Having thus described embodiments of the invention in general terms, reference will now be made to the accompanying drawings, which are not necessarily drawn to scale, and wherein:

FIG. 1 provides a schematic diagram of an exemplary system for executing ad-hoc commands on public cloud-based computing resources, in accordance with embodiments of the present invention;

FIG. 2 provides a block diagram on a computing platform configured to receive commands, initiate the process for command execution on the public cloud-based computing resources and receive the results of the command, in accordance with embodiments of the present invention;

FIG. 3 provides a block diagram of a cloud computing environment including a command queue and a command executer installed on public cloud-based computing resources, in accordance with embodiments of the present invention;

FIG. 4 provides a swim lane diagram of a process for executing ad-hoc commands on public cloud-based computing resources, in accordance with embodiments of the present invention; and FIG. 5 provides a flow diagram of a method for executing ad-hoc commands on public cloud-based computing resources, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for indirect access to public cloud-based computing resources for the purpose of running ad-hoc commands, on-demand, on applications being executed on such resources. As previously discussed, direct access to cloud-based computing resource typically requires a user to access a console/command line interface and provide requisite user credentials (e.g., user ID and password) to the cloud-based computing resource in order for the command(s) to be run. Thus, in conventional direct access scenarios, the user credentials are exposed in the public cloud computing environment. The present invention, through the use of indirect access to the cloud-based computing resource, eliminates the need to communicate user credentials to the public cloud computing environment.

As will be discussed in greater detail below, a user (i.e., command requester) will select or otherwise generate a command, which prompts a message, including the command, to be sent to cloud-based command queue. The command queue acts as the intermediary between the user and the public cloud-based computing resources. In this regard, a command executor agent installed on the cloud-based computing resources polls the queue for associated commands (i.e., commands that are designated for the application(s) being executed on the cloud-based computing resources) and, once obtained, runs the commands within the associated application(s). Results of the command are communicated from the cloud-based computing resource to the command queue, which is periodically polled by a monitoring queue in order for the user/command requester to obtain the results of the execution of the command.

Referring to FIG. 1, a schematic diagram is provided of an exemplary system 10 for executing ad-hoc commands on public cloud-based computing resources, in accordance with embodiments of the present invention. In accordance with embodiments of the present invention, a command entry entity 20, such as an enterprise or the like, has applications (not shown in FIG. 1) that are currently being executed on cloud-based computing resources 30 within a public cloud computing environment 40. A cloud-based computing resource may 30 include any virtual computing means used to process data. A user 50 (i.e., enterprise employee/agent or the like) has a desire to execute an ad-hoc command at the application currently running on the cloud-based computing resources 30. In specific instances, the command entry entity 20 may have rules in place, such as Global Information Security (GIS) rules that prohibit the user 50 from directly accessing the cloud-computing resource to run commands, such as access via a remote desktop/console or the like that allows for command line entries.

The system 10 includes a command entry interface 60, which is accessed by the user/command requester 50 for the purpose of entering a command that is required to run on a currently executing application within the public cloud-based computing environment 40. In specific embodiments of the invention, as a means of added security, the command(s) may be selected from a group of pre-scanned/pre-authorized commands that have been verified by a security governing authority. In other embodiments of the invention, the user 50 may dynamically generate the command(s) as dictated by their current needs. In addition, the command entry interface 60 is configured to, upon receiving the command(s), generate a message, including the command(s), which is communicated to the public cloud computing environment 40. In specific embodiments of the invention, the command entry interface 60 may include one or more encryption algorithms configured to encrypt the command(s) in the message or the message itself.

The system further includes a command queue 70 that is stored in virtual cloud memory and is configured to receive and store the messages that include the commands. The command queue 70 serves as the intermediary resource between the user 50/command entry entity 20 and the public cloud-based computing resource 30. As such, the command queue 70 provides for a user 50/command entry entity 20 to indirectly access the cloud-based computing resources 30 for the purpose of executing the ad-hoc commands. The command queue 70 may be associated with (i.e., accessible to) one public cloud computing environment (i.e., one public cloud), such as shown in FIG. 1, or, in other embodiments, the command queue 70 may be configured to be associated with (i.e., accessible to) multiple different public cloud computing environment (i.e., more than one public cloud). Additionally, while public cloud computing environment 40 is shown in FIG. 1 as including a single command queue 70, it should be apparent that the public cloud computing environment 40 may include or have access to multiple command queue 70 (e.g., each command queue 70 being associated with a different command entry entity 20 or the like).

The system 10 additionally includes a command executer 80, which is an agent installed on each cloud-based computing resource 30 that are in communication with the command queue 70. The command executor 80 is configured to poll the command queue 70 to retrieve command(s) that are associated with one or more applications currently running on the associated cloud-based computing resource 30 and execute the retrieved commands within the one or more applications. In response to executing the commands, the command executor 80 is further configured to communicate a result of executing the command to the command queue 70. In specific embodiments in which the command has been encrypted, the command executor 80 is further configured to implement one or more decryption algorithms to decrypt the command prior to executing the command. In other optional embodiments of the system, the command executor 80 is further configured to implement one or more encryption algorithms to encrypt the results of the command prior to communicating the results to the command queue 70.

In other embodiments of the invention, a queue monitor 90 is configured to poll the command queue 70 to retrieve the results of executing the command(s) one the applications(s) running on the associated cloud-based computing resource 30. In those embodiments in which the result has been encrypted, the queue monitor 90 may include one or more decryption algorithms configured to decrypt the command results.

Referring to FIG. 2 a block diagram is presented of an apparatus 100 implemented at or by a command entry entity 20, in accordance with embodiments of the present invention. In addition to providing more details for the system 10, FIG. 2 provides various optional embodiments of the apparatus 100 and system 10. The apparatus 100 may comprise one or more computing devices, such as servers, personal computers, laptops and the like implemented at or by the command entry entity 20. The apparatus 100 includes a computing platform 102 having a memory 104 storing instructions therein, and a processor 106 in communication with the memory. The memory 104 may comprise volatile and non-volatile memory, such as read-only and/or random-access memory (RAM and ROM), EPROM, EEPROM, flash cards, or any memory common to computer platforms).

The processor 106 may be application-specific integrated circuits ("ASICs"), or other chipsets, logic circuits, or other data processing device(s). Processor 106 may execute an application programming interface ("API") (not shown in FIG. 2) that interfaces with any resident programs (i.e., command entry interface 60, queue monitor 90) stored in the memory 104 of the computing platform 102. Processor 106 may include various processing subsystems (not shown in FIG. 2) embodied in hardware, firmware, software, and combinations thereof, that enable the functionality of the computing platform 102 and the operability of the computing platform 102 on a distributed computing network that allows for the computing platform 102 to communicate with the public cloud computing environment 40. For example, processing subsystems allow for initiating and maintaining communications and exchanging data with other real or virtual networked devices, including the command queue 70. For the disclosed aspects, processing subsystems of processor 106 may include any subsystem used in conjunction with command entry interface 60, queue monitor 90 and related, codes, routines, sub-routines, algorithms, sub-algorithms, modules, sub-modules thereof.

The computing platform 102 additionally includes communication mechanism 108 embodied in hardware, firmware, software, and combinations thereof, that enables electronic communications between the computing platform 102 and other platforms, apparatus and/or devices, such as command queue 70 located within the public cloud computing environment 40 (i.e., "the cloud"). Thus, communication mechanism 108 may include the requisite hardware, firmware, software and/or combinations thereof for establishing and maintaining a network communication connection.

The memory 104 of computing platform 104 stores command entry interface 60 that is executable by processor 106 and configured to provide a user 50 (shown in FIG. 1) the ability to input commands 11, absent the use of a console/command line interface for providing direct access to the cloud computing resources 30. In specific embodiments of the invention the commands 110 are pre-scanned and/or pre-approved (i.e., authorized) commands 112, which are selected by the user 50. In such embodiments, the command entry interface 60 may be configured with a drop-down menu or the like which lists all of the available pre-scanned and/or pre-approved commands 112 from which the user may choose one or more commands. In other embodiments of the invention, the commands 110 are dynamically generated commands 114, which are scripted by the user 50 based on current entity 20 requirements or the like. In such embodiments of the invention in which the commands 110 are dynamically generated at the time of the command request/entry, the memory 104 of computing platform 102 may additionally store a command scanner/approval mechanism 120 that is configured to scan and/or approve a command prior to initiating the command execution process. In such embodiments of the invention, the command may be scanned to determine actions that are forbidden or otherwise require approval to be executed. Further, once scanned, the command and the results of the scanned may be communicated to an approval authority for approving/disapproving the command. In the event that the command is approved, the command may be added to the list of pre-scanned/pre-approved commands 112.

The command entry interface 20 is additionally configured to generate and initiate the communication of a message 130 that includes the command(s) 110 to the command queue 50 (shown in FIG. 1). The message 130 may include one or more of a cloud identifier 132, a command queue identifier 134, an application identifier 136 and/or a cloud-based computing resource identifier 138 so as to insure that the command is processed properly (i.e., insure that the message is communicated to the proper cloud environment 40 and/or command queue 50 and/or retrieved by the proper cloud-based computing resource 30).

As previously discussed, in specific embodiments of the invention the computing platform 102 may include an encryption mechanism 140, such as one or more encryption algorithms configured to encrypt the command(s) 110 and/or the message 130.

In other specific embodiments of the invention, the memory 104 of computing platform 102 stores queue monitor 90 that includes a polling mechanism 150 configured to periodically poll the command queue 70 for retrieving command results 160. In those embodiments of the invention, in which the command results 160 are encrypted, the queue monitor 90 may additionally include a decryption mechanism 170, such as one or more decryption algorithms configured to decrypt the command results 160.

Referring to FIG. 3 a block diagram is presented of cloud computing environment 40, in accordance with embodiments of the present invention. In addition to providing more details for the cloud computing environment 40, FIG. 3 provides various optional embodiments of the system 10. The cloud computing environment may include virtual processing means 200 and a communication mechanism 210 for communicating within in the cloud and with the distributed communication network (i.e., the command entry interface 60, the queue monitor 90 and the like).

As previously discussed the cloud computing environment 40 includes a command queue 70 that is stored in virtual memory and is configured to receive messages 130 communicated from the command entry interface 60 and store the commands 110 in the queue 70. In this regard, the command queue 70 acts as the intermediary/gateway between the user 50/command entry entity 70 and the cloud-based computing resources 30 and provides the user 50/command entry entity 70 indirect access to the cloud-based computing resources 30 for the purpose for executing commands 110. In addition, to storing the commands 110, the queue may, in some embodiments, include a cloud-based computing resource's command capacity/limit determiner 230 that is configured to determine/identify the configurable threshold limit on how many simultaneous commands may be executed at a cloud-based computing resource 30 and, in response to such a determining that the threshold limit has been met, hold the commands in the queue until the threshold limit is no longer met (i.e., the number of simultaneous command executions at the resource 30 fails below the number of executions allowed). The threshold limit on how many simultaneous commands may be executed at a cloud-based computing resource 30 is a configurable limit as dictated by the cloud service provider or the like.

In addition, cloud computing environment 40 includes a plurality of cloud-based computing resources 30 having a virtual memory 240 that stores one or more applications 260 executed by virtual processing means 200. The virtual memory 240 of cloud-based computing resource 30 stores a command executor 80, such as an agent or the like. The command executor 80 includes a polling mechanism 250 that is configured to, in response to executing one or more of the applications 260, poll the command queue 50 to retrieve commands 110 associated with the application(s) 260 currently being executed on the cloud-based computing resource 30. In those embodiments of the invention, in which the command 110 is encrypted, the command executor 80 includes a decryption mechanism 270, such as one or more decryption algorithms or the like configured to decrypt the commands 110.

The command executor 80 is further configured to execute the command 110 within the application 260 and, in response to execution, provide a command result 280 (e.g., indication of whether command successfully executed, logs retrieved and the like), which is communicated to the command queue 50 for subsequent retrieval by the queue monitor 70 (shown in FIG. 3). In specific embodiments of the invention, the command executor 80 may include an encryption mechanism 290, such as one or more encryption algorithms configured to encrypt the command result 280 prior to communicating the command result 280 to the command queue 70.

Referring to FIG. 4 a swim lane diagram is presented of a process for indirect execution of ad-hoc commands in a public cloud computing environment, in accordance with embodiments of the present invention. At Event 400, a user 50 enters a command into a command entry interface 60. The command may be selected from a listing of pre-scanned/pre-approved commands meeting information security requirements or the command may be generated by the user at the time of command entry.

At Event 410, a message containing the command is communicated from the command entry interface 60 to a cloud-based command queue 70, which as the intermediary between the user 50/command entry entity 20 and the cloud-based computing resource 30 (shown in FIGS. 1 and 3). Since the command is accessing the cloud-based computing resource 30 indirectly via the command queue 70, the message does not include user credentials typically required to execute a command directly via a console/command line interface. In specific embodiments of the process, the command and/or message is encrypted at the command entry interface 60 prior to communicating the message to the command queue 70.

The command is held in the command queue 70 until, at Event 420, the command executor 80 installed on the cloud-based computing resource 30 polls the command queue 70 to retrieve commands designated for applications/services being currently run on the cloud-based computing resource 30. In the event that the command is encrypted, the command executor 80 is configured to decrypt the command prior to execution of the command. At Event 430, the command executor 80 executes the command within the application/service currently running on the cloud-based computing resource and, at Event 440, communicates the result of the command to the command queue 70. In those embodiments of the invention in which the results of the command are encrypted, the command executor 80 is configured to encrypt the result of the command prior to communicating the result to the command queue 70.

At Event 450, the queue monitor 90 periodically polls the command queue 70 to retrieve the result of the command. In those embodiments of the invention in which the results of the command are encrypted, the command monitor 90 is configured to decrypt the result of the command.

Referring to FIG. 5 a flow diagram is presented of a method 500 for indirect execution of ad-hoc commands in a public cloud computing environment, in accordance with embodiments of the present invention. In accordance with embodiments of the present invention, the methodology may be a series of instructions/codes stored one a computer-readable medium of a computer program product. At Event 510, command(s) are received that require execution by an application currently running on a cloud-based computing resource within a public cloud environment. The command may be selected from a listing of pre-scanned/pre-approved commands meeting information security requirements or the command may be generated prior to receiving the command.

At Event 520, a message containing the command is generated and communicated to the public cloud environment, specifically, a command queue within the cloud. In specific embodiments, the message and/or command may be encrypted prior to communicating the message to the public cloud environment. Since the command is accessing the cloud-based computing resource indirectly via the command queue, the message does not include user credentials typically required to execute a command directly via a console/command line interface. At Event 530, the message is received by and stored within a cloud-based command queue, which is a gateway between the command requester and the cloud-based computing resource(s).

At Event 540, the command queue is polled by an agent on the cloud-based computing resource to retrieve commands designated for applications/services being currently run on the cloud-based computing resource. In those embodiments of the method in which the command is encrypted, the command is decrypted at the cloud-based computing resource prior to execution of the command. At Event 550, the command is executed within the application/service currently running on the cloud-based computing resource and, at Event 560, the cloud-based computing resource communicates the result of the command to the command queue. In those embodiments of the invention in which the results of the command are encrypted, the cloud-based computing resource encrypts the result of the command prior to communicating the result to the command queue 70.

At Event 570, the command queue is periodically polled to retrieve the result of the command. In those embodiments of the invention in which the results of the command are encrypted, the queue polling mechanism (e.g., queue monitor) is configured to decrypt the result of the command.

Thus, systems, apparatus, methods, and computer program products described above provide for indirect access to public cloud-based computing environments for the purpose of running ad-hoc commands, on-demand, on any public cloud-based computing resource. As such, by being able to execute commands without having to directly access the cloud computing resources via a console and/or command line interface, the present invention provides added security, in that, user credentials are not required to be communicated to the cloud computing environment.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for executing ad-hoc commands on cloud-based computing resources in a public cloud computing environment, the system comprising:
  a computing platform including a memory and at least one processor in communication with the memory;

a command entry interface stored in the memory, executable by the at least one processor and configured to (i) receive one or more commands that require execution by an application being run on one or more cloud-based computing resources within the public cloud computing environment, (ii) scan the one or more commands to identify actions that are forbidden and, based on a result of the scan, provide approval for the command to be executed by one or more applications running on associated cloud-based computing resources, and (iii) generate and communicate one or more messages including the one or more commands to the public cloud computing environment, wherein the one or more messages identify (i) one or more applications that the commands are required to be executed on, (ii) one or more cloud-based computing resources on which the one or more applications are executed, and (iii) one or more cloud computing networks including the one or more cloud-based computing resources;

a command queue stored in cloud computing environment memory and configured to (i) receive and store the one or more messages including the one or more commands; and a command executor agent installed on the one or more cloud-based computing resources and configured to (i) poll the command queue to retrieve one or more commands that are associated with one or more applications currently running on an associated cloud-based computing resource, (ii) execute the retrieved one or more commands within the one or more applications, and (iii) communicate a result of executing the one or more commands to the command queue, wherein the command queue is further configured to (ii) receive and store the result of executing the one or more commands within the one or more applications running on the associated cloud-based computing resource.

2. The system of claim 1, further comprising a command queue monitor stored in the memory, executable by the at least one processor and configured to poll the command queue to retrieve the result of executing the one or more commands within the one or more applications running on the associated cloud-based computing resource.

3. The system of claim 1, wherein the one or more commands are added to a listing of a plurality of predetermined commands that have been scanned and approved for execution by the one or more applications running on associated cloud-based computing resources.

4. The system of claim 1, wherein the command queue is further configured to determine a number of simultaneous command executions allowed for a cloud-based computing resource and queue a retrieval of commands by the cloud-based computing resource based on the number of simultaneous command executions allowed for the cloud-based computing resource.

5. The system of claim 1, wherein the command entry interface is further configured to encrypt the one or more commands in the one or more messages prior to communicating the one or more messages to the public cloud computing environment.

6. The system of claim 5, wherein the command executor agent is further configured to decrypt the one or more commands in the one or more messages prior to executing the one or more commands within the one or more applications running on the associated cloud-based computing resource.

7. The system of claim 1, wherein the command executor agent is further configured to encrypt the result of executing the one or more commands prior to communicating the result to the command queue.

8. The system of claim 2, wherein the command executor agent is further configured to encrypt the result of executing the one or more commands prior to communicating the result to the command queue and wherein the command queue monitor is further configured to decrypt the result.

9. The system of claim 1, wherein the command entry interface is configured to generate and communicate the one or more messages, wherein the one or more messages do not identify user credentials associated with a user that inputted the one or more commands.

10. An apparatus for executing ad-hoc commands on cloud-based computing resources in a public cloud computing environment, the apparatus comprising:

a computing platform including a memory and at least one processor in communication with the memory; and a command entry interface stored in the memory, executable by the at least one processor and configured to (i) receive one or more commands that require execution by an application being run on one or more cloud-based computing resources within the public cloud computing environment, (ii) scan the one or more commands to identify actions that are forbidden and, based on a result of the scan, provide approval for the command to be executed by one or more applications running on associated cloud-based computing resources, and (iii) generate and communicate one or more messages including the one or more commands to the public cloud computing environment, wherein the one or more messages identify (i) one or more applications that the commands are required to be executed on, (ii) one or more cloud-based computing resources on which the one or more applications are executed, and (iii) one or more cloud computing networks including the one or more cloud-based computing resources, wherein a command queue stored in the cloud computing environment receives and stores the one or more messages including the one or more commands and a command executor agent installed on the one or more cloud-based computing resources polls the command queue to retrieve one or more commands that are associated with one or more applications currently running on an associated cloud-based computing resource, executes the retrieved one or more commands within the one or more applications, and communicates a result of executing the one or more commands to the command queue.

11. The apparatus of claim 10, further comprising a command queue monitor stored in the memory, executable by the at least one processor and configured to poll the command queue to retrieve the result of executing the one or more commands within the one or more applications running on the associated cloud-based computing resource.

12. The apparatus of claim 10, wherein the one or more commands are added to a listing of a plurality of predetermined commands that have been scanned and approved for execution by the one or more applications running on associated cloud-based computing resources.

13. The apparatus of claim 10, wherein the command entry interface is further configured to encrypt the one or more commands in the one or more messages prior to communicating the one or more messages to the cloud computing environment.

14. The apparatus of claim 10, wherein the command entry interface is configured to generate and communicate the one or more messages, wherein the one or more messages do not identify user credentials associated with a user that inputted the one or more commands.

15. A non-transitory computer-readable medium, the computer-readable medium comprising:
- a first set of codes for causing a computer to receive one or more commands that require execution by an application being run on one or more cloud-based computing resources within the public cloud computing environment;
- a second set of codes for causing a computer to scan the one or more commands to identify actions that are forbidden and, based on a result of the scan, provide approval for the command to be executed by one or more applications running on associated cloud-based computing resources;
- a third set of codes for causing a computer to generate and communicate one or more messages including the one or more commands to the public cloud computing environment, wherein the one or more messages identify (i) one or more applications that the commands are required to be executed on, (ii) one or more cloud-based computing resources on which the one or more applications are executed, and (iii) one or more cloud computing networks including the one or more cloud-based computing resources;
- a fourth set of codes for causing a virtual computer to receive and store, at a cloud-based command queue, the one or more messages including the one or more commands;
- a fifth set of codes for causing a virtual computer to poll, from a cloud-based computing resource, the command queue to retrieve one or more commands that are associated with one or more applications currently running on the cloud-based computing resource;
- a sixth set of codes for causing a virtual computer to execute, at the cloud-based computing resource with the one or more applications, the retrieved one or more commands;
- a seventh set of codes for causing a virtual computer to communicate a result of executing the one or more commands to the command queue.

16. The computer-readable medium of claim 15, wherein the computer-readable medium comprises an eighth set of codes for causing a computer to poll the command queue to retrieve the result of executing the one or more commands within the one or more applications running on the associated cloud-based computing resource.

17. The computer-readable medium of claim 15, further comprising an eighth set of codes for causing a computer to add the one or more commands to a listing of a plurality of predetermined commands that have been scanned and approved for execution by the one or more applications running on associated cloud-based computing resources.

* * * * *